(12) United States Patent
Kuhn et al.

(10) Patent No.: US 9,207,839 B2
(45) Date of Patent: Dec. 8, 2015

(54) DEVICE AND METHOD FOR DISPLAYING A MULTITUDE OF PLANAR OBJECTS

(71) Applicant: VOLKSWAGEN AG, Wolfsburg (DE)

(72) Inventors: Mathias Kuhn, Berlin (DE); Tobias Budzynski, Berlin (DE); Jian Lou, Berlin (DE); Soenke Petersen, Berlin (DE); Kyoung Sun Han, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 297 days.

(21) Appl. No.: 13/796,862

(22) Filed: Mar. 12, 2013

(65) Prior Publication Data

US 2014/0215369 A1    Jul. 31, 2014

(30) Foreign Application Priority Data

Jan. 25, 2013    (DE) ................. 20 2013 000 751 U

(51) Int. Cl.
| | |
|---|---|
| *G06F 3/048* | (2013.01) |
| *G06F 3/0482* | (2013.01) |
| *G06F 3/0488* | (2013.01) |
| *G11B 27/10* | (2006.01) |
| *G11B 27/34* | (2006.01) |
| *G06F 3/0481* | (2013.01) |

(52) U.S. Cl.
CPC ............ *G06F 3/0482* (2013.01); *G06F 3/0488* (2013.01); *G11B 27/105* (2013.01); *G11B 27/34* (2013.01); *G06F 3/0481* (2013.01); *G06F 2203/04807* (2013.01)

(58) Field of Classification Search
CPC .... G06F 3/0482; G06F 3/0481; G06F 3/0488
USPC ........................................ 715/766
See application file for complete search history.

(56) References Cited

U.S. PATENT DOCUMENTS

| | | | | |
|---|---|---|---|---|
| 6,337,698 | B1* | 1/2002 | Keely et al. ................... | 715/823 |
| 8,217,914 | B2* | 7/2012 | Koshiyama et al. ........... | 345/173 |
| 8,576,181 | B2* | 11/2013 | Cho ........................ | G06F 3/044 |
| | | | | 345/173 |
| 2002/0140746 | A1* | 10/2002 | Gargi ............................ | 345/853 |
| 2005/0240880 | A1* | 10/2005 | Banks et al. .................. | 715/836 |
| 2006/0131868 | A1* | 6/2006 | Matsuda ......................... | 283/67 |
| 2006/0161868 | A1* | 7/2006 | Van Dok ............... | G06F 3/0481 |
| | | | | 715/835 |
| 2008/0288895 | A1* | 11/2008 | Hollemans .............. | G06F 3/041 |
| | | | | 715/863 |
| 2008/0307350 | A1* | 12/2008 | Sabatelli et al. .............. | 715/779 |

FOREIGN PATENT DOCUMENTS

DE    10 2007 039 445     2/2009

* cited by examiner

*Primary Examiner* — William Bashore
*Assistant Examiner* — Gregory A Distefano
(74) *Attorney, Agent, or Firm* — Kenyon & Kenyon LLP

(57) ABSTRACT

A device for displaying a multitude of planar objects arranged in at least one stack, includes a display area, e.g., a touch-screen, for displaying the stack; a processing unit to generate and modify graphics data of the objects; and a proximity ascertainment device for detecting an operating element in a proximity region in front of the display surface or an input device. The processing unit is arranged such that the graphics data of the objects are generated so that the at least one stack is displayed on the display area in different display states, i.e., a first mode, preferably a pure display mode; a second mode, in which an operating element is detected in the proximity region in front of the display area or an input device; and a third mode, following the touching or selection of the display area or an object displayed on the display area.

28 Claims, 4 Drawing Sheets

DEVICE AND METHOD FOR DISPLAYING A MULTITUDE OF PLANAR OBJECTS

CROSS-REFERENCE TO RELATED APPLICATIONS

The present application claims priority to Application No. 20 2013 000 751.6, filed in the Federal Republic of Germany on Jan. 25, 2013, which is expressly incorporated herein in its entirety by reference thereto.

FIELD OF THE INVENTION

The present invention relates to a device for displaying a multitude of planar objects arranged in at least one stack, having a display area, preferably arranged as touchscreen, for displaying the at least one stack of objects; a processing unit which is able to generate and modify graphics data of the objects; and a proximity ascertainment sensor for detecting an operating element in a proximity region in front of the display area or in front of an input device. In addition, the present invention relates to a method for displaying a multitude of planar objects, arranged in at least one stack, on a display area.

BACKGROUND INFORMATION

A motor vehicle is equipped with different information and communication areas to which display instruments are assigned. They are provided to inform the driver and the passengers. Furthermore, they can assist the driver in the navigation or the communication with the outside world. The display may visually display traffic- or vehicle-related data, for example. A so-called instrument cluster is typically disposed near the driver's primary field of vision. For example, it displays the speed, the tank content level and other information of the motor vehicle related to its operation. In addition, it is possible to display radio and audio functions.

Because of the rising number of electronic devices in motor vehicles, it has become quite common these days to equip vehicles also with a display and operating system that has a graphical user interface in order to allow an intuitive operation and control of the various electronic devices in the vehicle. For example, it is desirable in this context to display the information such that the driver is able to absorb it rapidly and intuitively, so that the comprehension of the displayed information does not distract the driver from driving. Furthermore, the operation should be intuitive, simple and quick so that the driver is able to operate the devices of the vehicle for which the information is displayed by the display device, even while driving. The display of information and the operation associated with a display of information in the motor vehicle thus increase the safety while driving the motor vehicle.

German Published Patent Application No. 10 2007 039 445 describes a device for displaying information on a display area in a motor vehicle. The device has a processing unit and a proximity sensor system, which detects an approach of an operating element in the direction of the display area, the display switching from a display state to an operating state when the display area is approached.

SUMMARY

Example embodiments of the present invention provide a device and a method for displaying a multitude of planar objects arranged in at least one stack, which, in the pure display state, gives the user a rapid overview of as many pieces of information as possible. As soon as an operating intention is detected, a rapid change takes place from the display state to an operating mode, in which the user is provided with a multitude of operating options that allow a simple and intuitive selection of the objects.

According to example embodiments of the present invention, the processing unit of the device for displaying a multitude of planar objects arranged in at least one stack is configured such that the graphics data of the objects are generated so that the at least one stack of objects is displayed in different display states in the display area, i.e., in a first mode, which preferably is a pure display mode; in a second mode, in which an operating element is detected in the proximity region in front of the display area or in front of an input device; and in a third mode, following the touching or selection of the display area or an object displayed on the display area.

The processing unit may be configured such that the graphics data of the objects in the first mode are generated so that the first object of the at least one stack is displayed on the display device. The first object preferably is the currently selected object, so that in the display state, this is the most important information for the user in this particular state when, for example, images (covers) of albums or music pieces are shown. This may also be the first object of the stack or the object of the stack that was selected last.

The processing unit may be configured such that the graphics data of the objects in the second mode are generated so that the individual objects of the at least one displayed stack are displayed substantially one behind the other, preferably in overlapping fashion, so that the user very rapidly gets a general idea as to whether objects are included in the stack, and how many.

However, it may also be the case that in the first mode, the graphics data of the objects are generated such that the individual objects of the at least one displayed stack are displayed one behind the other, preferably in overlapping manner, so that in display mode, the user is provided with an overview of the objects located within the stacks. In the second mode, only one object of the displayed stacks of objects will then be displayed in order to make it easier for the user to select a stack from which he wants to choose objects in the third mode.

The processing unit may be configured such that in the third mode, the graphics data of the objects are generated such that the individual objects of the at least one stack are displayed at an offset one behind the other, at a greater distance from each other than in the second mode, for the selection of the objects with the aid of the operating element. This gives the user the chance to call up and/or select individual objects of a stack in an uncomplicated manner.

It may furthermore be provided that at least two stacks of objects are displayed in the first and second mode, but that only the selected stack is displayed once a stack has been selected with the aid of the operating element.

The processing unit may be configured such that when the first displayed object is touched by the operating element, or when the first displayed object of a stack displayed on the display area is selected with the aid of an input device, a change takes place from the second to the third mode.

In a method for displaying a multitude of planar objects arranged in at least one stack on a display area, graphics data of the objects included in the at least one stack are generated such that in a first mode, the at least one stack of objects is shown in a first display state. In the second mode, when a proximity ascertainment device detects an operating element such as the finger or the hand of a user in a proximity region in front of the display area or in front of an input device, e.g., an operating device for controlling a cursor on the display area, the at least one stack of planar objects will be shown in a second display state. In a third mode, following the selection by means of a cursor, or following touching of the display area or of an object shown on the display area, the at least one stack of objects is shown in a third display state.

Only the first object of the at least one stack of objects may be shown on the display area in the first mode. In the display of media data, for example, this could be the currently selected album or song. The first mode may be a pure display mode, which is arranged for an optimal display of the objects in order to provide the driver with an intuitively comprehensible display in an arrangement of the display area in a vehicle.

The individual objects, or a subset of the objects, of the displayed stacks may be substantially displayed one behind the other and in partially overlapping form in the second mode.

The graphics data of the objects in the first mode may be generated such that the individual planar objects, or a subset of the objects, of the displayed stacks are/is shown substantially one behind the other in overlapping form, so that in display mode, the viewer is provided with a rapid overview of the approximate number of objects in the stack. In this configuration, it may be the case that only one object of the shown stacks is displayed on the display area in the second mode.

In the third mode, the stacks of planar objects are shown optimized for an operation or selection. The individual objects, or a subset of the objects, of the displayed stacks may be displayed at an offset one behind the other and in overlapping form, at a distance that allows an unambiguous selection of the individually desired object.

At least two stacks of objects may be displayed on the display area.

In addition, in the third mode, i.e., the operating mode, it is possible that only the selected stack of objects is shown on the display area, even if multiple stacks were shown in the first and second mode.

The device may be used in vehicles for the display and operation of electronic devices in the vehicle or of vehicle-related functions, and also in mobile devices, to operate media or telephone functions. Other areas of use are also possible.

Further features and aspects of example embodiments of the present invention are described in more detail below with reference to the appended Figures.

DETAILED DESCRIPTION

Figure 1:
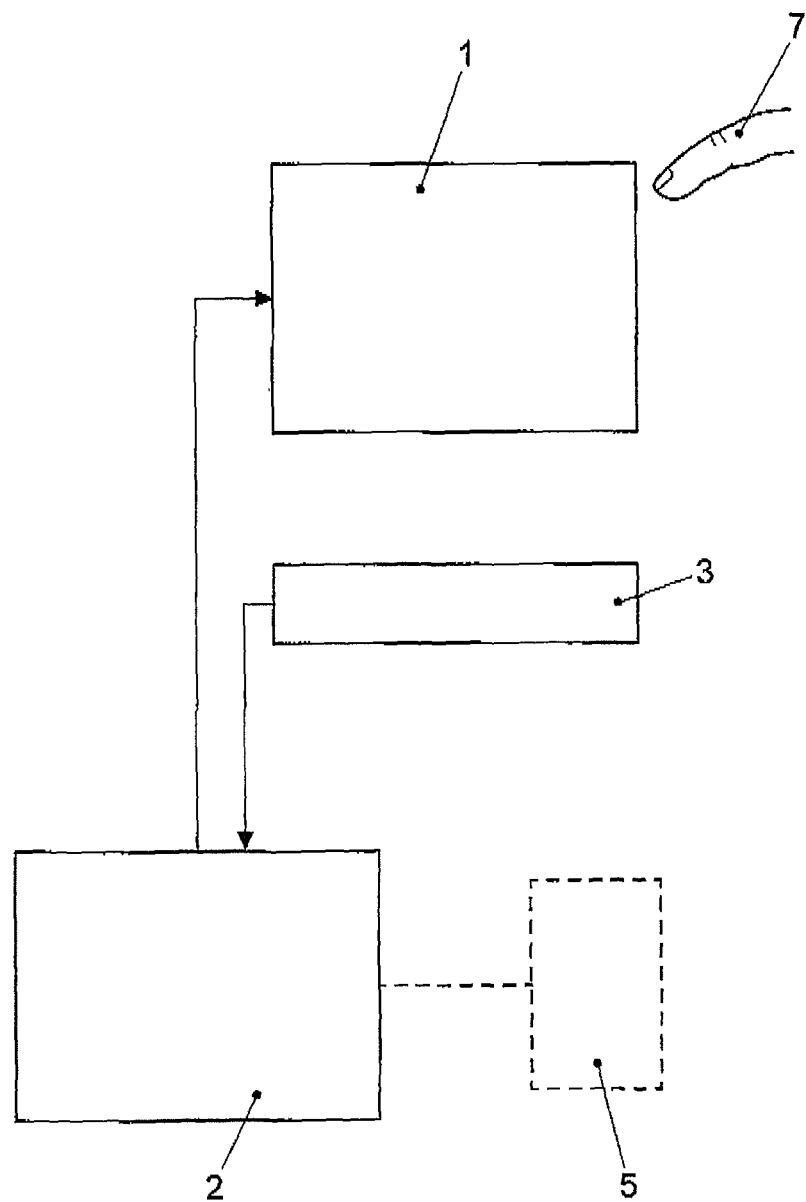
FIG. 1 schematically illustrates a device according to an example embodiment of the present invention.

The device according to an example embodiment of the present invention is illustrated in FIG. 1 and includes a display area 1, which is arranged as a so-called touchscreen; a processing unit 2, which is able to generate and modify graphics data of displayed objects 6 (FIG. 2); and a proximity ascertainment device 3 for detecting an operating element 4, e.g., a user's finger, in the proximity region in front of display area 1. If display area 1 is not arranged as a touchscreen, an input device 5, e.g., a rotary/pressure pickup, is provided in addition for calling up and selecting displayed objects 6. In this case proximity ascertainment device 3 detects the approach of operating element 4 toward input device 5. In addition, the two configurations of the device are able to be combined, in which case the display area is arranged as touchscreen, and an input device is provided in addition. Such a proximity ascertainment device is described, for example, in U.S. Patent Application Publication No. 2011/0221696, for example, which is expressly incorporated herein in its entirety by reference thereto. Other configurations of the proximity ascertainment device are also possible.

Figure 2A:
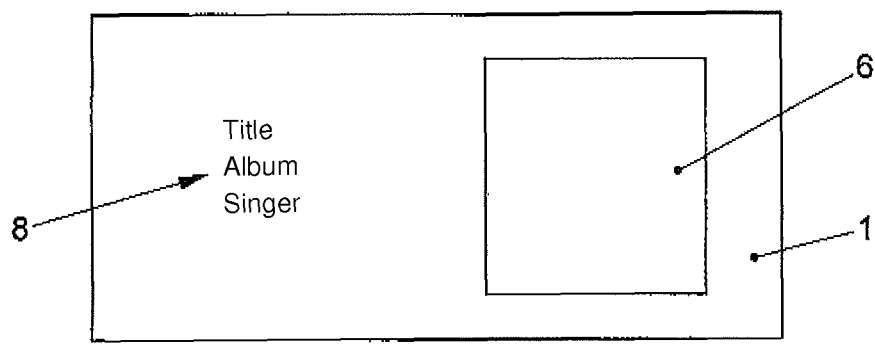
FIGS. 2a to 2c illustrate a possible display of the stacks of objects on a display area in the various modes.
Figure 2B:
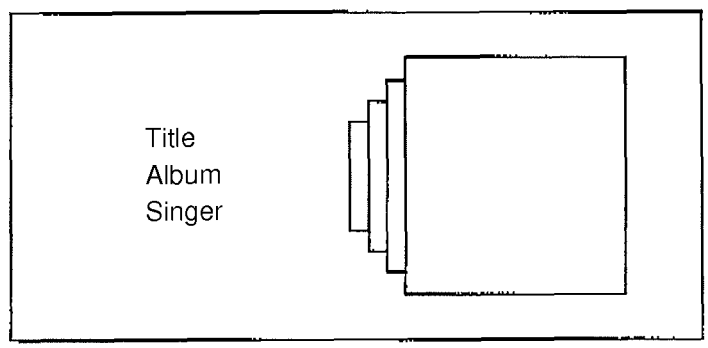
Figure 2C:
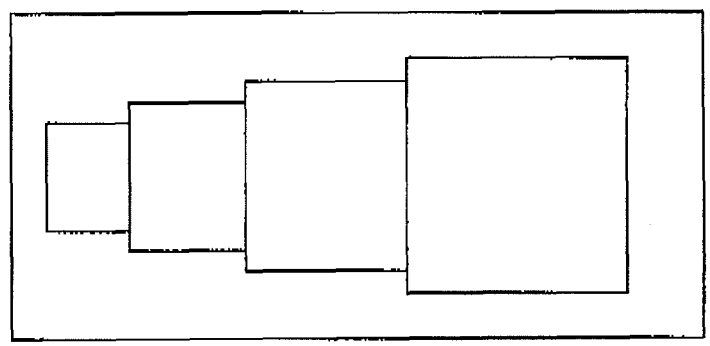

FIGS. 2a to 2c show an example of the various display states of display area 1 in the three modes based on a display and operating sequence for selecting objects (images) in shown stacks for songs in an entertainment function. FIG. 2a shows display area 1 in a pure display state in which no operation is intended. Object 6 in the form of an image which represents the currently playing song is shown on the right side of display area 1. The other objects in stack 4 are not visible. The left side of display area 1 is available for additional information 8 of the currently playing song, e.g., the singer, the album from which the song was taken, and the title of the song.

If an operating element 7 (FIG. 1) approaches the display area or operating device 5 within a defined distance (detection of an operating intention), the display on display area 1 switches from the first to the second display state, as shown in FIG. 2b. In this display state, stack 4 including objects 6 is opened up, i.e., objects 6 of stack 4 are displayed in overlapping fashion one behind the other, so that the user gets an overview of the number of objects in the stack, in other words, how many songs are included in the play list represented by stack 6. In this particular example, supplementary information 8 about the currently playing song continues to be available in addition.

If a specific operation then takes place by touching display area 1 or object 6 using operating element (7) (the user's finger) or by selecting object 6 with the aid of input device 5, the display on display area 1 switches to the third display state, as shown in FIG. 2c. Stack 4 is displayed on display area 1 in the form of an open fan, so that the user is able to select individual objects 6 of stack 4 in a simple manner. Supplementary information 8 is no longer shown since it is no longer important at the time when the user intends to select a new song. If it is impossible to display all objects 6 of a stack 4 on the display area in an operable manner, then stack 4 may be shown in parts, between which a change is possible by simple operator acts, which are not shown in greater detail.

Figure 3A:
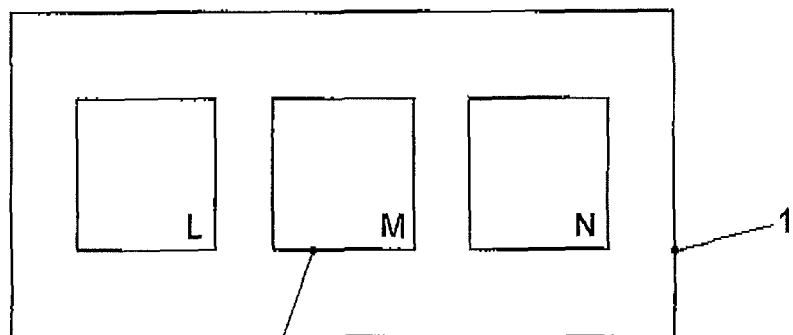
FIGS. 3a to 3c illustrate another possible display of the stacks of objects on display area in the various modes.
Figure 3B:
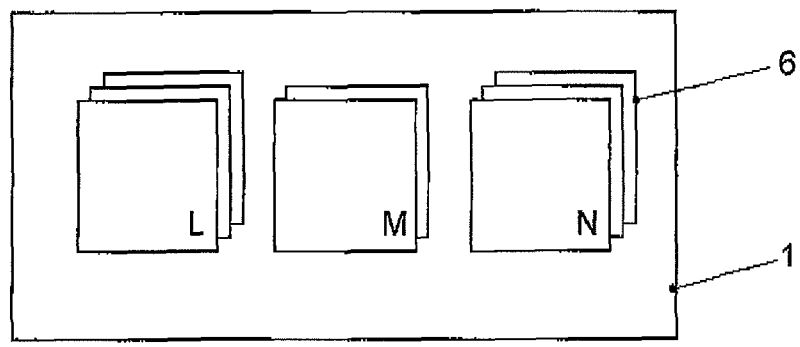
Figure 3C:
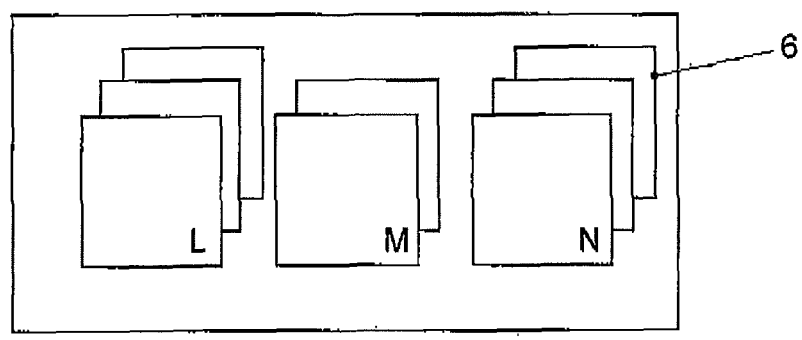

FIGS. 3a to 3c show another example for generating graphics data of objects 6 on display area 1 with the aid of processing unit 2, using an address book for a telephone. The address book is subdivided into lists (stack 4) which represent a letter of the alphabet. The lists (stacks 4) for the letters L, M and N are shown on display area 1. Lists for other letters are able to be displayed on display area 1 by corresponding operator inputs.

In the first display state (FIG. 3a), only first objects 6 of the stacks are shown. If an approach of an operating element 7 in the direction of input device 5 or, in the case of a touchscreen, of display area 1 is detected, the display on display area 1 switches to the second display state, as shown in FIG. 3b. All objects 6 of the subset of stacks 4 shown on display area 1 are displayed in the form of an open fan, in overlapping fashion, so that a user is easily able to grasp whether, and how many, objects 6 are included in stack 4 (list). If the user then touches first object 6 of one of stacks 4, the distance between individual objects 6 of stacks 4 increases, so that the user is easily able to select one of the objects. As an alternative to the touchscreen, an object may also be selected with the aid of input device 5 (FIG. 3c).

Figure 3D:
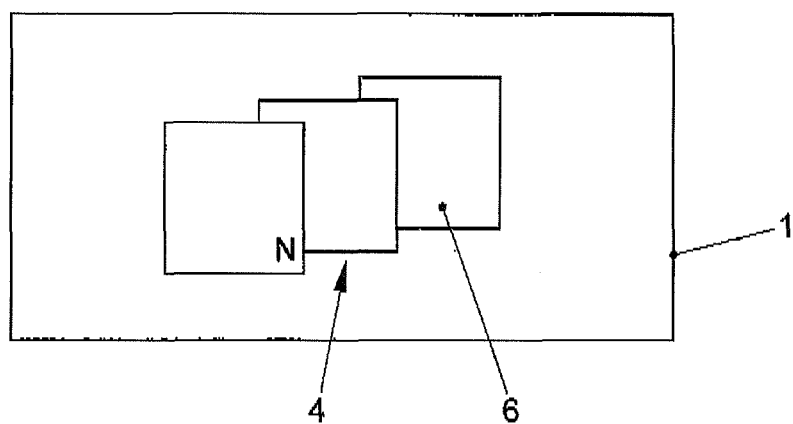
FIG. 3d illustrates a second variant of the display of objects on display area of FIG. 3c in the third mode.

FIG. 3d shows another option for the manner in which the processing unit may generate graphics data of objects 6 in the third display state. When an object 6 of a stack 4 is selected, only the particular stack 4 of selected object 6 with objects 6 of stack 4 disposed in overlapping fashion one behind the other is displayed (list N of the address book).

The illustrated exemplary embodiments do not constitute a restriction, but are simply examples of a multitude of possible uses of the system and method described herein.

What is claimed is:

1. A device for displaying a plurality of planar objects arranged in at least one stack, comprising:
    a display area adapted to display the at least one stack of objects;
    a processing unit adapted to generate and modify graphics data of the objects; and
    a proximity ascertainment device adapted to detect an operating element in a proximity region in front of the display area or in front of an input device, the processing unit adapted to generate the graphics data of the objects so that the at least one stack of objects is displayed on the display area in a first mode, in a second mode, and in a third mode;
    wherein, in the first mode, the at least one stack of objects is displayed in a first display state, the graphics data of the objects generated so that only a first object of the at least one stack is shown on the display area;
    wherein in the second mode, in which the proximity ascertainment device detects an operating element in the proximity region in front of the display area or in front of the input device, the at least one stack of objects is shown in a second display state, the graphics data of the objects generated so that the at least one stack of objects is expanded to display objects behind the first object; and
    wherein, in the third mode, following selection or touching of the display area or an object shown on the display area, using the operating element, the at least one stack of objects is displayed in a third display state, the graphics data of the objects generated so that individual objects, or a subset of the objects, of the displayed stacks are displayed substantially at an offset one behind the other, at a greater distance from each other than in the second mode, for selection of the objects using the operating element.

2. The device according to claim 1, wherein the processing unit is configured such that in the second mode, the graphics data of the objects are generated so that individual objects, or a subset of the objects, of the displayed stacks are displayed substantially one behind the other and/or in an overlapping manner.

3. The device according to claim 1, wherein the processing unit is configured such that at least two stacks of objects are displayed on the display area.

4. The device according to claim 3, wherein the processing unit is configured such that in the third mode, the graphics data of the objects are generated so that when a stack of objects is selected, only the selected stack of objects is displayed on the display area.

5. The device according to claim 2, wherein the processing unit is configured such that when a first displayed object of a stack displayed on the display area is selected by the operating element or the input device, a change takes place from the second mode to the third mode.

6. The device according to claim 1, wherein the display is configured to show the at least one stack of objects in the first and/or second mode, and supplementary information related to the at least one stack of objects.

7. The device according to claim 6, wherein the display is configured to show the at least one stack of objects in the third mode without displaying the supplementary information.

8. The mobile device according to claim 1, wherein the display is configured to show the at least one stack of objects in the first and/or second mode, and supplementary information related to the at least one stack of objects.

9. The mobile device according to claim 8, wherein the display is configured to show the at least one stack of objects in the third mode without displaying the supplementary information.

10. A method for displaying a plurality of planar objects, arranged in at least one stack, on a display area, comprising:
    generating graphics data of the objects in a processing unit such that the at least one stack of objects is displayed on the display area;
    wherein, in a first mode, the at least one stack of objects is displayed in a first display state, the graphics data of the objects generated so that only a first object of the at least one stack is shown on the display area;
    wherein, in a second mode, in which a proximity ascertainment device detects an operating element in a proximity region in front of the display area or in front of an input device, the at least one stack of objects is displayed in a second display state, the graphics data of the objects generated so that the at least one stack of objects is expanded to display objects behind the first object; and
    wherein, in a third mode, following selection or touching of the display area or of an object shown on the display area, the at least one stack of objects is displayed in a third display state, the graphics data of the objects generated so that individual objects, or a subset of the objects, of the displayed stacks are displayed substantially at an offset one behind the other, at a greater distance from each other than in the second mode, for selection of the objects using the operating element.

11. The method according to claim 10, wherein the graphics data of the objects in the second mode are generated such that individual objects, or a subset of the objects, of the displayed stacks are displayed substantially one behind the other and/or in an overlapping manner.

12. The method according to claim 10, wherein at least two stacks of objects are displayed on the display area.

13. The method according to claim 12, wherein the graphics data of the objects in the third mode are generated such that only the selected stack of objects is displayed on the display area when selecting a stack of objects.

14. The method according to claim 11, wherein a change from the second mode to the third mode takes place when a first displayed object of a stack displayed on the display area is selected by the operating element or the input device.

15. The method according to claim 10, wherein the display is configured to show the at least one stack of objects in the first and/or second mode, and supplementary information related to the at least one stack of objects.

16. The method according to claim 15, wherein the display is configured to show the at least one stack of objects in the third mode without displaying the supplementary information.

17. A vehicle, comprising:
a device adapted to display a plurality of planar objects arranged in at least one stack, including a display area adapted to display the at least one stack of objects;
a processing unit adapted to generate and modify graphics data of the objects; and
a proximity ascertainment device adapted to detect an operating element in a proximity region in front of the display area or in front of an input device;
wherein the processing unit is adapted to generate the graphics data of the objects so that the at least one stack of objects is displayed on the display area in a first mode, in a second mode, and in a third mode;
wherein, in the first mode, the at least one stack of objects is displayed in a first display state, the graphics data of the objects generated so that only a first object of the at least one stack is shown on the display area;
wherein, in the second mode, in which a proximity ascertainment device detects an operating element in the proximity region in front of the display area or in front of the input device, the at least one stack of objects is displayed in a second display state, the graphics data of the objects generated so that the at least one stack of objects is expanded to display objects behind the first object; and
wherein, in the third mode, following selection or touching of the display area or of an object shown on the display area by the operating element, the at least one stack of objects is displayed in a third display state, the graphics data of the objects generated so that individual objects, or a subset of the objects, of the displayed stacks are displayed substantially at an offset one behind the other, at a greater distance from each other than in the second mode, for selection of the objects using the operating element.

18. The vehicle according to claim 17, wherein the processing unit is configured such that in the second mode, the graphics data of the objects are generated so that individual objects, or a subset of the objects, of the displayed stacks are displayed substantially one behind the other and/or in an overlapping manner.

19. The vehicle according to claim 17, wherein the processing unit is configured such that at least two stacks of objects are displayed on the display area.

20. The vehicle according to claim 19, wherein the processing unit is configured such that in the third mode, the graphics data of the objects are produced so that only a selected stack of objects is shown on the display area when selecting a stack of objects.

21. The vehicle according to claim 18, wherein the processing unit is configured such that when a first displayed object of a stack displayed on the display area is selected by the operating element or the input device, a change takes place from the second to the third mode.

22. The vehicle according to claim 17, wherein the display is configured to show the at least one stack of objects in the first and/or second mode, and supplementary information related to the at least one stack of objects.

23. The vehicle according to claim 22, wherein the display is configured to show the at least one stack of objects in the third mode without displaying the supplementary information.

24. A mobile device, comprising:
a device adapted to display a multitude of planar objects arranged in at least one stack, having a display area adapted to display the at least one stack of objects;
a processing unit adapted to generate and modify graphics data of the objects; and
a proximity ascertainment device adapted to detect an operating element in a proximity region in front of the display area or in front of an input device;
wherein the processing unit is adapted to generate the graphics data of the objects so that the at least one stack of objects is displayed on the display area in a first mode, in a second mode, and in a third mode;
wherein, in the first mode, the at least one stack of objects is displayed in a first display state, the graphics data of the objects generated so that only a first object of the at least one stack is shown on the display area;
wherein, in the second mode, in which the proximity ascertainment device detects an operating element in the proximity region in front of the display area or in front of the input device, the at least one stack of objects is displayed in a second display state, the graphics data of the objects generated so that the at least one stack of objects is expanded to display objects behind the first object; and
wherein, in the third mode, following selection or touching of the display area or of an object shown on the display area using the operating element, the at least one stack of objects is displayed in a third display state, the graphics data of the objects generated so that individual objects, or a subset of the objects, of the displayed stacks are displayed substantially at an offset one behind the other, at a greater distance from each other than in the second mode, for selection of the objects using the operating element.

25. The mobile device according to claim 24, wherein the processing unit is configured such that in the second mode, the graphics data of the objects are generated so that individual objects, or a subset of the objects, of the displayed stacks are displayed substantially one behind the other and/or in an overlapping manner.

26. The mobile device according to claim 24, wherein the processing unit is configured such that at least two stacks of objects are displayed on the display area.

27. The mobile device according to claim 26, wherein the processing unit is configured such that in the third mode, the graphics data of the objects are generated so that only a selected stack of objects is shown on the display area when a stack of objects is selected.

28. The mobile device according to claim 25, wherein the processing unit is configured such that when a first displayed object of a stack displayed on the display area is selected by the operating element or the input device, a change takes place from the second to the third mode.

* * * * *